June 19, 1923.

G. J. ZIEGLER 1,459,491

TRACTOR TRANSMISSION

Filed Jan. 16, 1922       5 Sheets-Sheet 1

Inventor
George J. Ziegler
By Semer G. Wells,
Attorney

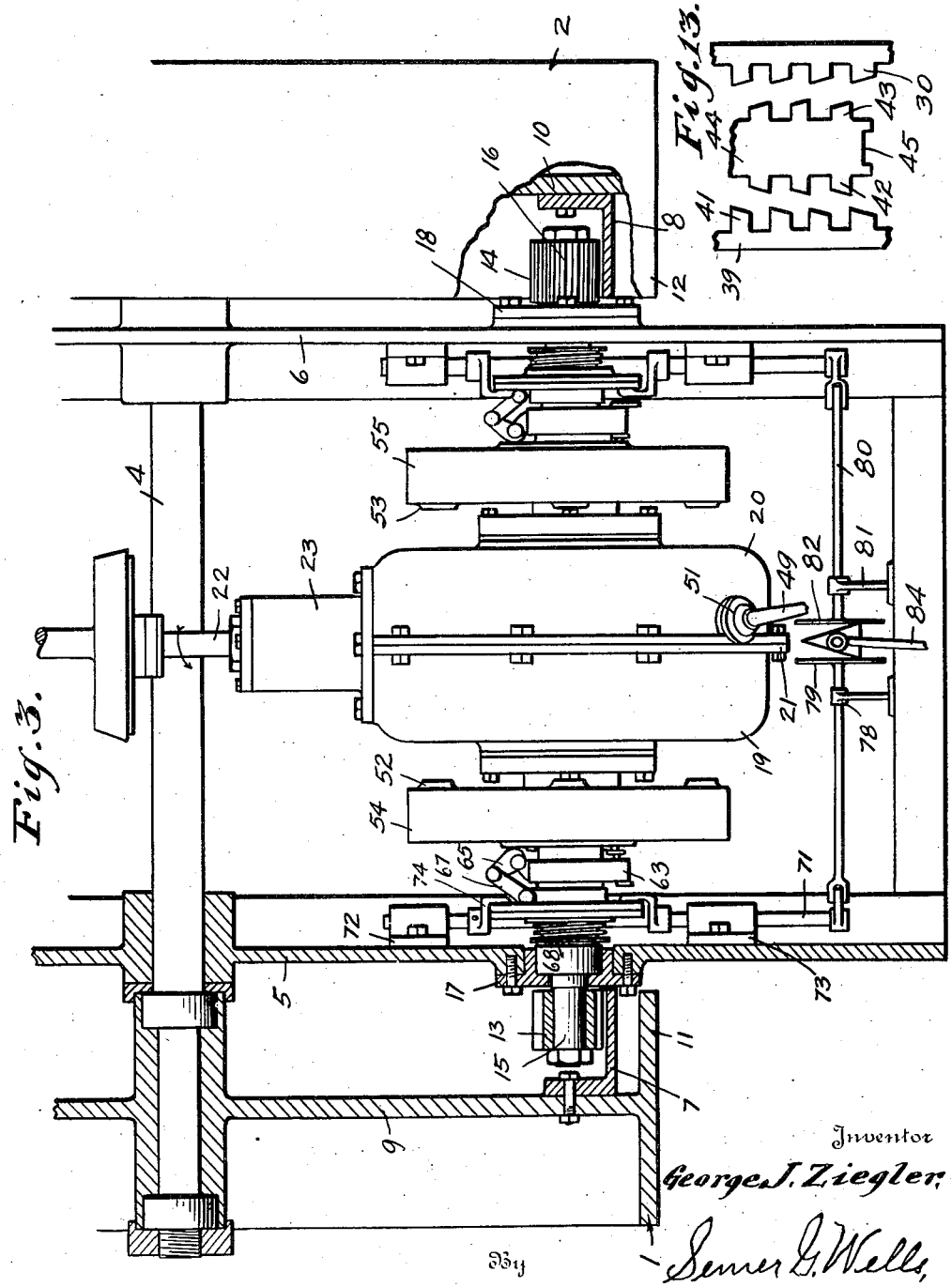

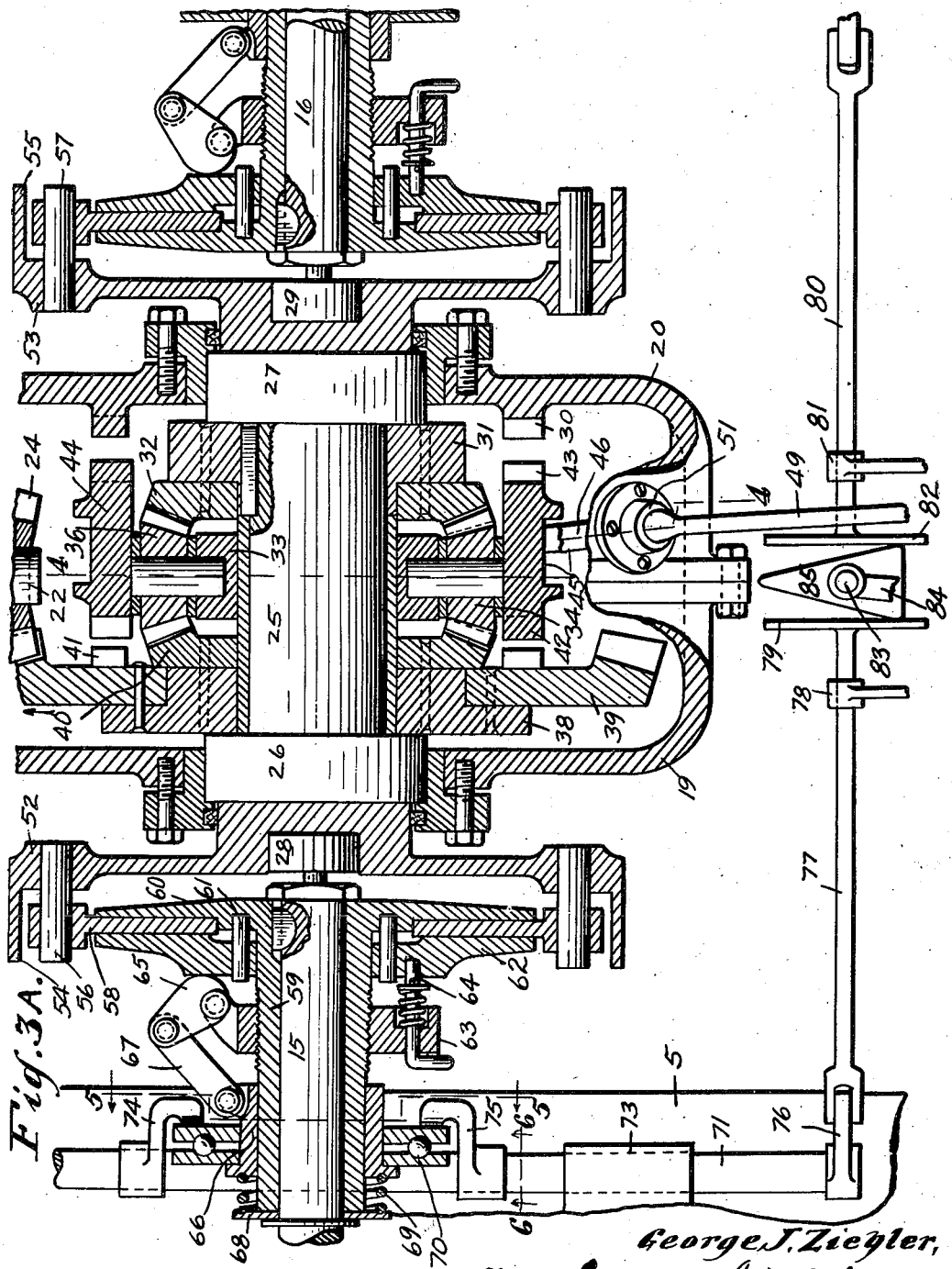

June 19, 1923.

G. J. ZIEGLER

TRACTOR TRANSMISSION

Filed Jan. 16, 1922

Inventor
George J. Ziegler,
By
James G. Wells,
Attorney

June 19, 1923.

G. J. ZIEGLER

TRACTOR TRANSMISSION

Filed Jan. 16, 1922

Inventor
George J. Ziegler,
By Sener G. Wells,
Attorney

Patented June 19, 1923.

1,459,491

UNITED STATES PATENT OFFICE.

GEORGE J. ZIEGLER, OF LOS ANGELES, CALIFORNIA.

TRACTOR TRANSMISSION.

Application filed January 16, 1922. Serial No. 529,537.

*To all whom it may concern:*

Be it known that I, GEORGE J. ZIEGLER, a citizen of the United States, residing at Los Angeles, California, have invented a certain new and useful Tractor Transmission, of which the following is a specification.

My object is to make an improved transmission for driving and steering a tractor, and my invention consists of the novel features herein shown, described and claimed.

Fig. 3 is an enlarged detail plan of the transmission.

Fig. 3A is an enlarged horizontal sectional detail on a plane parallel with Fig. 3.

Fig. 4 is a fragmentary vertical cross section on the line 4—4 of Fig. 3A.

Fig. 5 is a fragmentary cross section on the line 5—5 of Fig. 3A and 6.

Fig. 6 is a fragmentary sectional detail on the lines 6—6 of Figs. 3A and 5.

Figure 1:
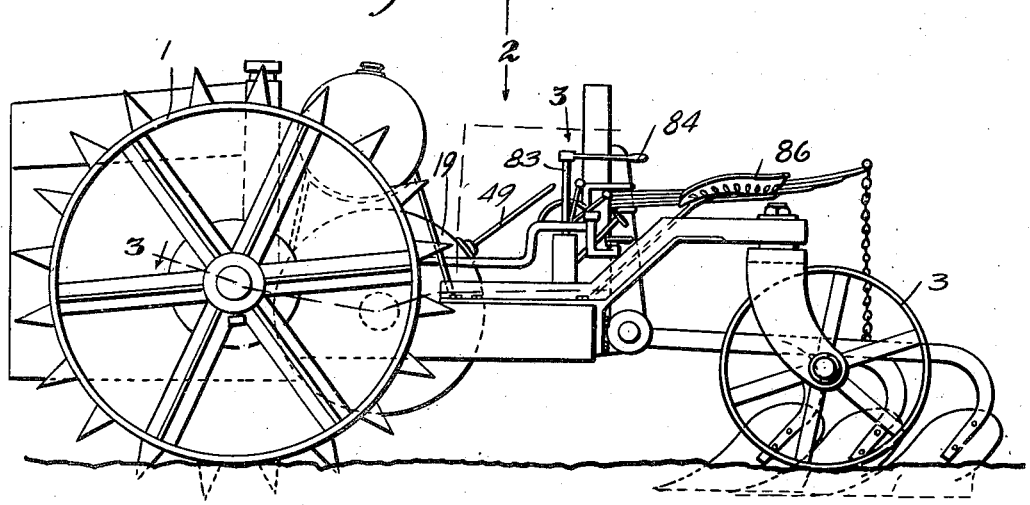
Fig. 1 is a side elevation of a tractor provided with a transmission embodying the principles of my invention, and as indicated by the arrow 1 in Fig. 2.
Figure 2:
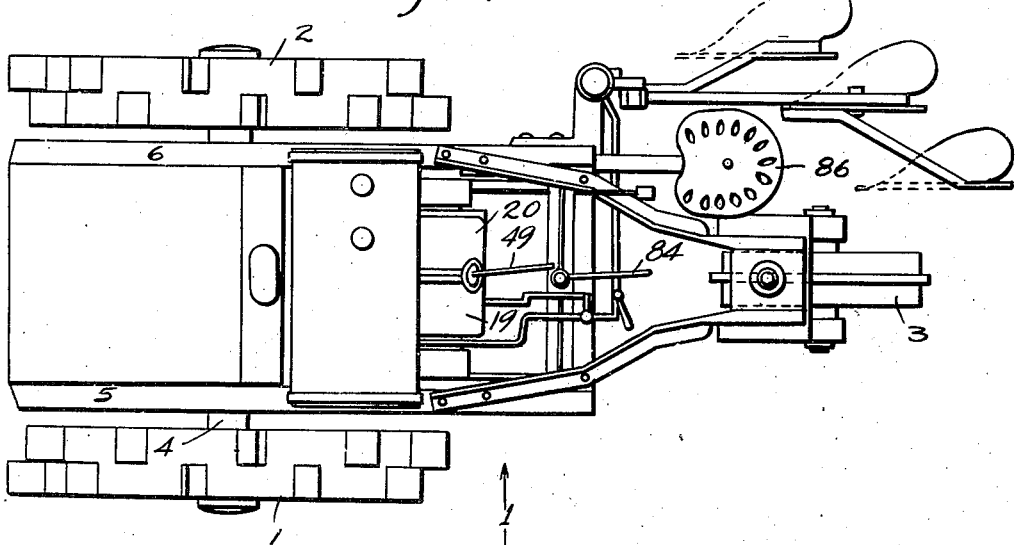
Fig. 2 is a top plan view as indicated by the arrow 2 in Fig. 1.

Figs. 7, 8, 9, 10, 11, and 12 are diagrammatic views showing the various manipulations and operations of driving and steering.

Fig. 13 is a diagrammatic section of the shifting gear and co-operating parts.

The tractor runs on the drive wheels 1 and 2 and the castor wheel 3. The drive wheels 1 and 2 are loosely mounted on the rigid axle 4. The frame bars 5 and 6 are mounted on the axle 4 and on the castor wheel 3. The bull gears 7 and 8 are fixed to the webs 9 and 10 of the drive wheels 1 and 2 and inside of the rims 11 and 12. The bull gear pinions 13 and 14 mesh with the bull gears 7 and 8 and are fixed upon the jack shafts 15 and 16 and the jack shafts 15 and 16 extend through bearings 17 and 18 in the frame bars 5 and 6.

The transmission case sections 19 and 20 are secured together on a vertical line by flanges and bolts 21. The section 22 of the drive shaft is mounted in a bearing 23 extending forwardly from the case and has a bevel pinion 24 inside of the case. The transmission shaft 25 is mounted in bearings 26 and 27, said bearings being mounted in the case horizontally and transversely and said transmission shaft 25 being in line with the jack shafts 15 and 16. Bearings 28 and 29 are mounted in the ends of the shaft 25 and the ends of the jack shafts fit into the bearings to support the ends of the jack shafts. A rigid gear 30 is formed upon the inner face of the case section 20. A hub 31 is keyed upon the shaft 25 and a bevel gear 32 is secured to the hub. A spider 33 is loosely mounted upon the center of the shaft 25 and bevel pinions 34, 35, 36, and 37 are mounted in the spider 33 in mesh with the gear 32. A hub 38 is loosely mounted upon the shaft 25, a bevel gear 39 is fixed to the hub 38 and meshes with the pinion 24 and a bevel gear 40 is fixed to the hub 38 and meshes with the pinions 34, 35, 36, and 37, said pinions serving as idlers between the gears 40 and 32. A gear 41 is formed upon the inner face of the body of the bevel gear 39. Shifting gears 42 and 43 are formed upon the sides of the ring 44 to match the gears 41 and 30 and the ring 44 is slidingly splined upon the spider 33 and has an external groove 45. A yoke 46 has rollers 47 and 48 running in the groove 45 diametrically opposite each other. A handle 49 extends from the center of the yoke 46 through the case, there being a ball 50 upon the handle mounted in a ball socket 51 in the case to form a pivot for the handle, and so that when the handle 49 is straight the shift gears 42 and 43 are in neutral positions out of mesh with the gears 41 and 30 and so that when the handle is moved to the right the gear 42 meshes with the gear 41 and when the handle is moved to the left the gear 43 meshes with the gear 30.

When the shaft 22 is running clockwise when seen from the front and as indicated by the arrow the gear 39 will run clockwise when seen from the right relative to the rear as indicated by the arrow. If the shift gears 42 and 43 are in neutral the idlers 34, 35, 36 and 37 will travel on the gear 32 and no power will be applied to the tractor. If the handle 49 is moved to the right the gear 42 will mesh with the gear 41 and hold the pinions from travelling on the gear 32 and rotation of the spider will drive the gear 32 thus driving the tractor ahead. If the handle 49 is moved to the left the gear 43 will mesh with the gear 30 and hold the spider and the pinions will rotate in the direction indicated by the arrow and communicate power to the gear 32 and drive the tractor backwards.

Of course it is assumed in the foregoing that the tractor wheels 1 and 2 are connected, and this connection is as follows: Driving clutch wheels 52 and 53 are keyed upon the ends of the shaft 25 and have rims 54 and 55 extending outwardly. Pins 56 and 57 are fixed in the wheels 52 and 53 parallel with the axis. A driving clutch ring 58 is floatingly mounted on the pins 56 and 57. A sleeve 59 is keyed upon the jack shaft 15 and a driven clutch member 60 is formed integral with the inner end of the sleeve 59 and fits the inner face of the ring 58. Pins 61 are fixed in the member 60 and the movable driver clutch member 62 is floatingly mounted on the pins 61 and fits the outer face of the ring 58 so that pressure against the outer face of the member 62 clamps the ring 58 between the members 62 and 60 and connects the jackshaft 15 to the transmission shaft 25. A hub 63 is screw seated upon the sleeve 59 and held in adjusted position by a latch 64. Bearings extend from the hub 63 and eccentric links 65 are connected to the bearings and bear against the member 62. A hub 66 is slidingly mounted upon the sleeve 59 and links 67 connect the hub 66 to the links 65. A flange 68 is mounted upon the shaft 15 and a spring 69 fits against the flange and presses against the sliding hub 66 hard enough to set the clutch, so that when the spring is released the tractor wheel 1 is connected to the transmission to be driven forwardly or backwardly. A thrust bearing 70 is mounted upon the sliding hub 66. A rock shaft 71 is mounted in bearings 72 and 73 fixed to the frame bar 5 and arms 74 and 75 extend upwardly and engage the inner face of the bearing 70 at diametrically opposite points. A crank arm 76 is fixed upon the rear end of the shaft 71 and extends upwardly. A push rod 77 is slidingly mounted in a bearing 78 and connected to the crank 76 and has a head 79 upon its inner end.

In a like manner the tractor wheel 2 is connected to be controlled by the push rod 80 mounted in the bearing 81 and having a head 82. A shaft 83 is mounted vertically and has a handle 84 on its upper end and a cam 85 on its lower end. The cam 85 is triangular in plan and substantially twice as wide one way as the other. Normally the handle 84 is straight or central and the cam fits the narrow way between the heads 79 and 82 and the clutch springs 69 are released and the tractor wheels 1 and 2 are connected through the clutches to the transmission shaft 25. If the handle 84 is turned to the right one-eighth of a turn for right hand steering the right hand wheel is released, and if the handle is turned to the left one-eighth of a turn the left hand wheel is released, and if the handle is turned either way a quarter turn both wheels are released. The springs 69 tend to move the heads 79 and 82 towards each other and the cam 85 forces the heads outwardly.

The driver's seat 86 is behind the tractor wheels, the caster wheel 3 is behind the seat and the handles 49 and 84 are within easy reach of the driver.

Figure 7:
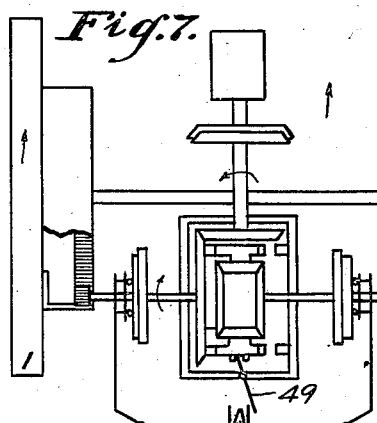

Referring to Fig. 7, the handle 49 was straight or neutral and the handle 84 was straight or neutral and the transmission running idle and the tractor wheels connected. Now the handle 49 is moved to the right and the tractor moves forwardly with both wheels under power.

Figure 8:
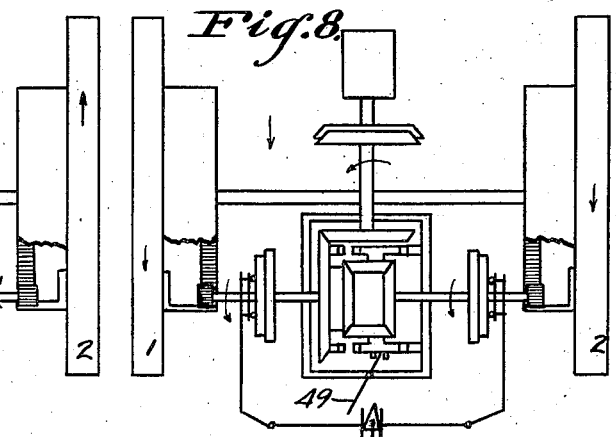

In Fig. 8, the handle 49 is moved to the left and the tractor wheels are both driven backwardly.

Figure 9:
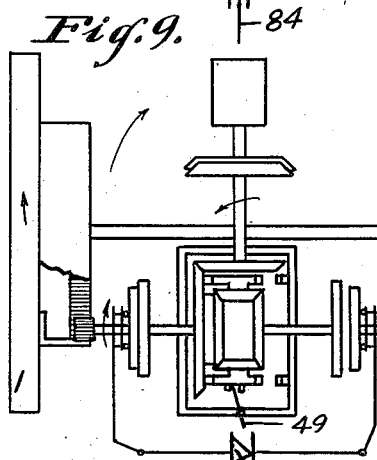

In Fig. 9, the handle 84 is moved to the right, thus releasing the right hand wheel, and the handle 49 moved to the right and the wheel 1 drives forwardly while no power is applied to the wheel 2 and the tractor turns in a circle with the wheel 2 as a center.

Figure 10:
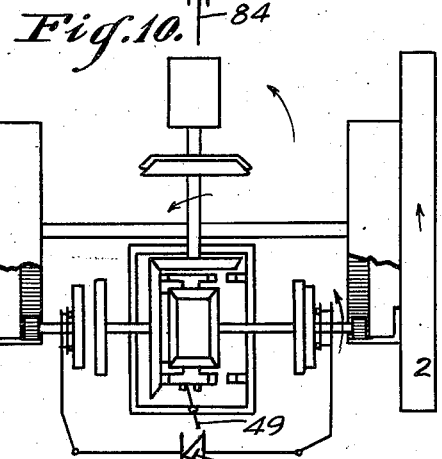

In Fig. 10, the handle 84 is moved to the left, thus releasing the left hand wheel and the tractor turns with the wheel 1 as a center.

Figure 11:
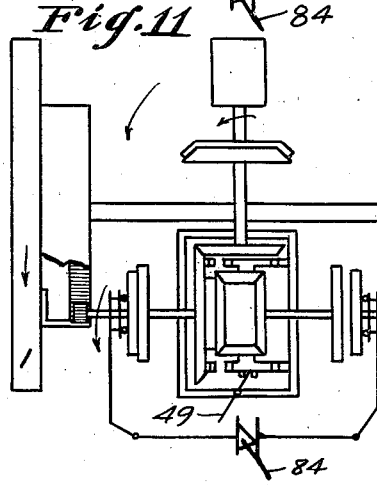
Figure 12:
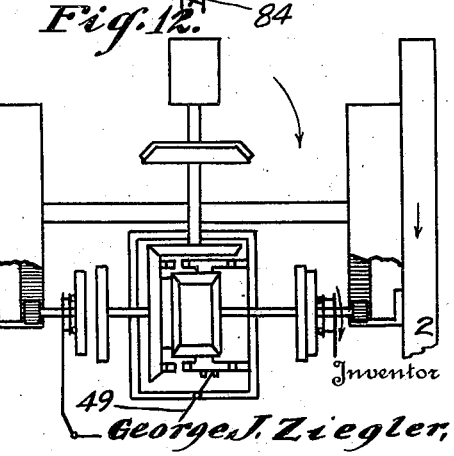

In Fig. 11 the handle 49 is moved to the left thus reversing the transmission and the handle 84 is moved to the right to unclutch the wheel 2 and the tractor turns backwardly, while in Fig. 12 the wheel 1 is unclutched and becomes the pivot.

The tractor shown is short. The engine is between the front parts of the drive wheels, that is just in front of the axle, and the transmission is all between the drive wheels behind the axle. The tractor will turn in a circle of which the axle is more than the diameter, by driving half way around forwardly and the other half way around backwardly.

Especial attention is called to the three transmission shafts 15, 16 and 25 mounted in a straight line, the connection between the drive shaft 22 and the transmission shaft 25 whereby the transmission shaft may be neutral or drive forwardly or backwardly and the normally closed clutches connecting the shafts 15 and 16 to the shaft 25, the handle 49 for controlling and reversing and the handle 84 for turning.

Various changes may be made without departing from the spirit of my invention as claimed.

I claim:

1. In a transmission, a transmission shaft mounted transversely, a bevel gear fixed upon one end of the transmission shaft, a spider loosely mounted upon the center of the transmission shaft, pinions mounted in the spider in mesh with the bevel gear, a second bevel gear loosely mounted upon the other end of the transmission shaft in mesh with the pinions, a transmission case in which the transmission shaft is mounted, a face gear rigid with the case, a ring slidingly splined upon the spider, a second face gear upon the ring adapted to mesh with the case gear, a third face gear upon the second bevel gear, a fourth face gear upon the ring adapted to mesh with the third face gear, a handle for operating the ring, a drive shaft, a bevel gear upon the drive shaft in mesh with the second bevel gear, jack shafts one at each end of the transmission shaft, clutches normally connecting the jack shafts to the transmission shaft, and means for releasing either or both clutches.

2. In a transmission, a case, a transmission shaft transversely in the case, a bevel gear fixed upon one end of the shaft, a spider loosely upon the center of the shaft, a second bevel gear loosely upon the other end of the shaft, means for driving the second bevel gear, pinions in the spider connecting the bevel gears, selective means for letting the spider run, or holding the spider or driving the spider, and selective clutches for connecting the transmission shaft to drive wheels.

3. A transmission shaft, a bevel gear fixed upon the transmission shaft, a spider loosely upon the transmission shaft, a second bevel gear loosely upon the opposite end of the transmission shaft from the first bevel gear, pinions in the spider connecting the bevel gears, a ring slidingly splined upon the spider, face gears upon the ring, a rigid face gear, a face gear carried by the second bevel gear, and means for moving the ring.

Witness my hand, this 3rd day of January 1922.

GEORGE J. ZIEGLER.